United States Patent [19]
Gunda et al.

[11] Patent Number: 4,643,074
[45] Date of Patent: Feb. 17, 1987

[54] POWER TRANSMISSION

[75] Inventors: Rajamouli Gunda, Rochester; Melvin A. Rode, West Bloomfield, both of Mich.

[73] Assignee: Vickers, Incorporated, Troy, Mich.

[21] Appl. No.: 709,134

[22] Filed: Mar. 7, 1985

[51] Int. Cl.$^4$ .................................................. F15B 13/16
[52] U.S. Cl. ............................................................ 91/361
[58] Field of Search ....................... 91/361, 362, 363 R, 91/459

[56] References Cited

U.S. PATENT DOCUMENTS

| | | | |
|---|---|---|---|
| 2,777,285 | 1/1957 | McDonald | 91/361 X |
| 3,038,451 | 6/1962 | Sporn et al. | 91/361 X |
| 3,410,177 | 11/1968 | Roess et al. | 91/361 |

FOREIGN PATENT DOCUMENTS

| | | | |
|---|---|---|---|
| 6890 | 1/1977 | Japan | 91/361 |
| 192603 | 11/1982 | Japan | 91/361 |
| 1000612 | 3/1983 | Japan | 91/361 |
| 720198 | 3/1980 | U.S.S.R. | 91/361 |

*Primary Examiner*—Edward K. Look
*Attorney, Agent, or Firm*—Barnes, Kisselle, Raisch, Choate, Whittemore & Hulbert

[57] ABSTRACT

An electrohydraulic servo control system which includes a position feedback loop responsive to actual position at the hydraulic actuator and load, and a position command reference generator responsive to an operator joystick input command and to an operator mode select switch for generating a position command reference signal to the position loop as differing functions of the joystick input in each of the switch-selectable modes. The selectable modes of operation include an absolute position control mode wherein the joystick input is treated as indicating absolute desired position at the actuator and load, an incremental position control mode wherein the joystick input is treated as indicating desired change in position with reference to a base position, and a velocity control mode wherein the joystick input is treated as indicating velocity at the actuator and load desired by the operator.

5 Claims, 6 Drawing Figures (VELOCITY CONTROL MODE)

(INCREMENTAL POSITION CONTROL MODE)

(ABSOLUTE POSITION CONTROL MODE)

4,643,074

POWER TRANSMISSION

The present invention is directed to electrohydraulic valve control systems, and more particularly to systems for controlling valve output in differing modes of operation as correspondingly differing functions of operator input command signals.

BACKGROUND AND OBJECTS OF THE INVENTION

Electrohydraulic valve control systems for vehicles and like applications often require differing control modes at various stages of operation. For example, an excavator may require position control of the bucket teeth during a digging cycle, velocity control during other modes of operation, and incremental position control, i.e. position control from a starting or base position, during the fine control cycle. It is conventional to provide separate position and velocity sensors for closed loop feedback during the position and valocity control modes respectively. However, provision of multiple sensors adds to the overall cost and complexity of the system.

It is a general object of the present invention to provide an electrohydraulic valve control system which may selectively operate in either the position or the velocity control mode while employing only one feedback sensor. In this connection, it has been recognized that position feedback is more readily amenable to operator display and automation. It is therfore a more specific object of the invention to provide an electrohydraulic valve control system which employs a position sensor and feedback loop, and which is adapted selectively and alternately to function in either a position control mode or a velocity control mode.

Another object of the invention is to provide an electrohydraulic valve control system of the described character in which position control may be selectively and alternately implemented in either an absolute position control mode or an incremental position control mode, employing the same sensor, preferably a position sensor and feedback loop.

SUMMARY OF THE INVENTION

The present invention contemplates an electrohydraulic servo control system which includes an hydraulic valve servo actuator for variably positioning a load, such as the bucket of an excavator. A position sensing transducer is coupled to the actuator and load to provide an electrical signal indicative of actual position at the actuator and load. The actuator is controlled by an error signal as a function of the difference betwen a position command signal and the transducer signal indicative of actual position.

In accordance with the present invention, the position control servo system includes a command circuit responsive to an operator mode-select switch for generating the position command signal as differing functions of an operator input signal, from a joystick or the like, depending upon the selected control mode of operation. In an absolute position control mode, the position command signal is a direct continuous function of the joystick input command signal. In an incremental position control mode, a base position signal equal to the actual position signal is established when the input command position signal is equal to zero, and the position command signal thereafter varies as a function of the sum of the base position signal and the input command signal when the input command signal is non-zero. In a velocity control mode, the input command signal is first integrated to provide a facsimile position command signal. When the input command signal is non-zero, the position command signal varies as a direct function of the facsimile position command signal. When the input command signal is equal to zero, the position command signal is made equal to the actual position signal, eliminating dead time in the velocity control mode when it is desired to change the direction of motion at the load.

BRIEF DESCRIPTION OF THE DRAWINGS

The invention, together with additional objects, features and advantages thereof, will be best understood from the following description, the appended claims and the accompanying drawings in which:

DETAILED DESCRIPTION

Figure 1:
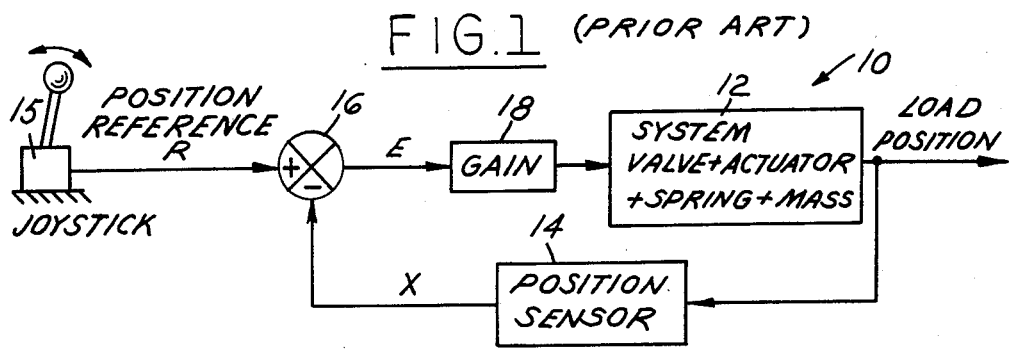
FIG. 1 is a functional block diagram of a position demand servo system in accordance with the prior art.
Figure 6:
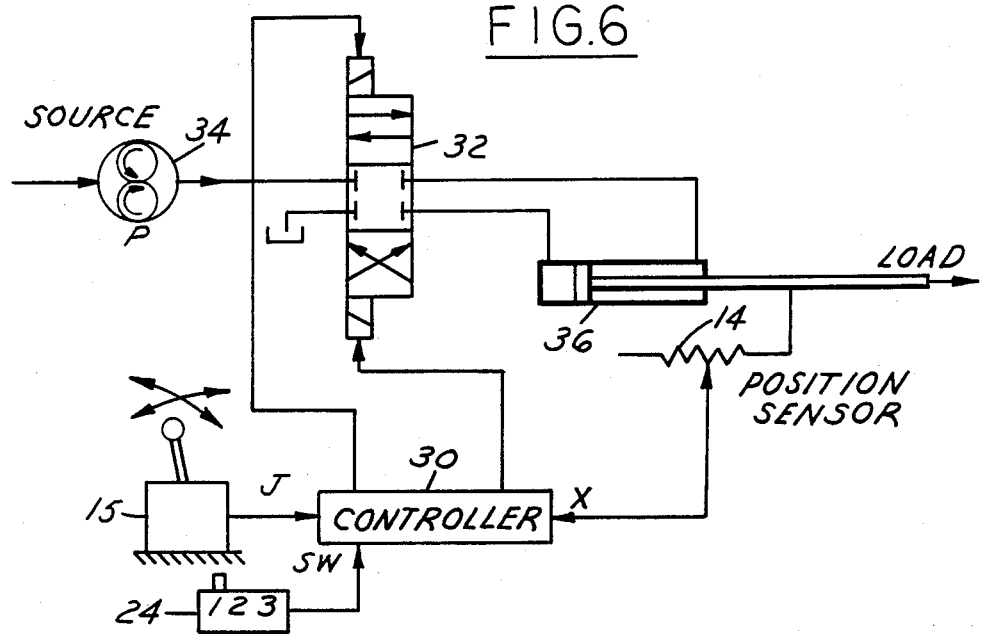
FIG. 6 is a schematic diagram of an exemplary electrohydraulic control system for implementing the invention.

FIG. 1 illustrates a conventional position command electrohydraulic servo control system 10 as comprising a valve actuator system 12, which includes an electrohydraulic servo valve coupled by an actuator to a load. The actuator system, including the load, is characterized by an inertial mass and spring elasticity. As also shown in FIG. 6, a position sensor or transducer 14 is suitably mechanically coupled to the actuator and load to provide an electrical output signal X as a function of actual actuator and load position. A position command or reference signal R from an operator joystick 15, for example, is fed to a summer 16, which provides an error signal E as a function of the difference between the command signal R and the actual position signal X. The error signal E, fed through a suitable amplifier having gain 18, controls operation of actuator 12. It will be appreciated that summar 16 and gain 18 would typically be comined in a single amplifier. System 12 and transducer 14 may be of any suitable types, and indeed may be contained within a single assembly.

Figure 2:
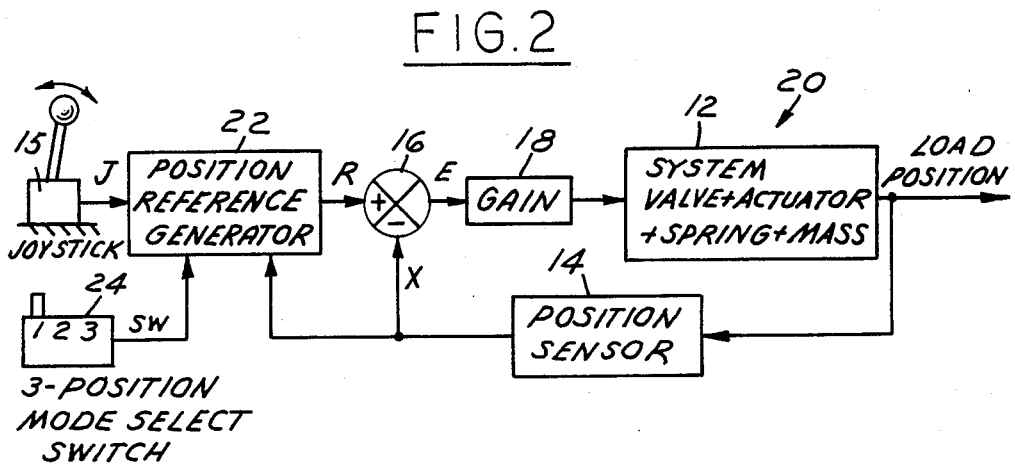
FIG. 2 is a functional block diagram of an electrohydraulic servo system in accordance with a presently preferred embodiment of the present invention.
Figure 3:
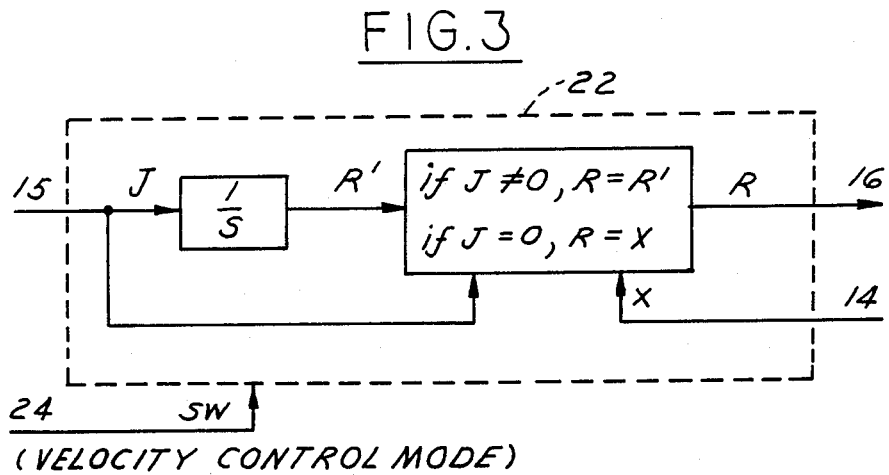
FIGS. 3, 4 and 5 are fragmentary block diagrams of the position reference generator illustrated in FIG. 2 in the velocity control, incremental position control and absolute position control modes of operation respectively.

FIG. 2 illustrates an electrohydraulic servo system 20 in accordance with a preferred embodiment of the invention wherein the operator joystick 15 provides an input joystick command signal J to a position reference generator or command circuit 22. Generator 22 also receives a mode control input SW from a three position mode select switch 24, and receives the signal X from sensor 14 indicative of actual position at the actuator and load. Generator 22 provides the position command reference output R to summer 16. The remaining elements in FIG. 2 correspond with identically referenced elements in FIG. 1. In the preferred embodiment of the invention, mode select switch 24 is responsive to manual activation by an operator for selecting among an absolute position control mode wherein the joystick output signal J is treating as indicating desired position at the actuator and load, an incremental position control mode wherein the joystick output signal J is treated as indicating a change of position desired by an operator from a base position, and a velocity control mode of operatio wherein the joystick output signal J is treated as indicating desired velocity at the actuator and load. Preferably, position reference generator 22 comprises a suitably programmed digital microprocessor, operation of which in the absolute position, incremental position and velocity control modes is illustrated functionally in FIGS. 5, 4 and 3 respectively.

Figure 4:
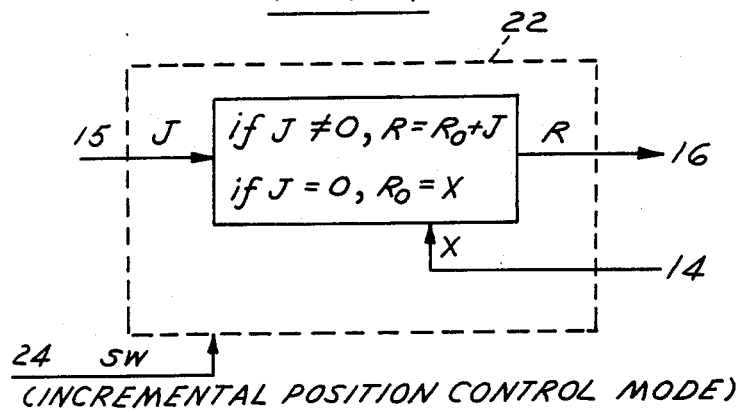
Figure 5:
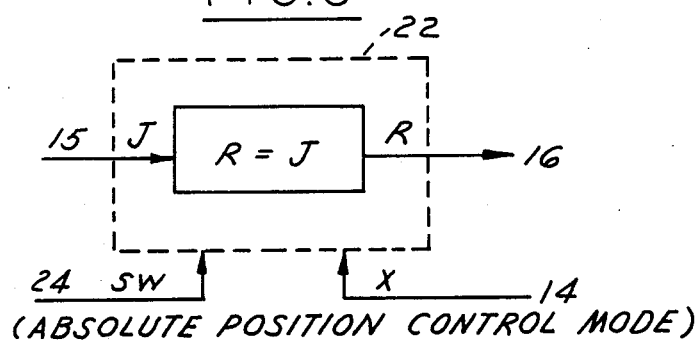

More particularly, when the absolute position control mode is selected by an operator at switch 24, position reference generator 22 is automatically internally configured as illustrated in FIG. 5 so that the position reference command signal R to summer 16 varies as a direct continuous function of, and preferably is made equal to, the input joystick command signal J. When incremental position control is selected at switch 24, generator 22 is functionally internally configured as illustrated in FIG. 4. When the input joystick command signal J is equal to zero in the incremental position control mode, the actual position signal X is stored to establish a base position signal $R_O$. Thereafter, when the input joystick command signal J departs from zero, the position reference command signal R to summer 16 varies as a function of, and preferably is made equal to, the sum of the base position equal $R_O$ and the input command signal J. When the velocity control mode of operation (FIG. 3) is selected at switch 24, the joystick input command signal J is integrated to provide a facsimile position command signal R', division of the signal J by the Laplace character "S" being a standard technique for illustrating an integration operation. If the joystick command input is equal to zero, the position command signal R to summer 16 is set equal to the actual position signal X from sensor 14, so that the error signal E (FIG. 2) will be equal to zero and no motion will take place at the actuator and load. When the joystick command signal J is non-zero, the position command signal R follows the facsimile position command signal R' so that the position loop is effectively controlled by the integral of the joystick input signal.

It is presently preferred to implement summer 16, gain stage 18 and position reference generator 22 (FIG. 2) in a suitably programmed digital computer/controller 30, as shown in FIG. 6, which receives and periodically samples input J from operator joystick 15, input SW from operator mode select switch 24 and input X from the load position sensor 14. Controller 60 provides outputs to the solenoids of a valve 32, from example, which selectively feeds hydraulic fluid under pressure from a source and pump 34 to a drive cylinder 36. The piston of cylinder 36 is coupled to the load. Analog circuitry could also be employed in controller 30, as will be apparent to the artisan. Likewise, it is contemplated that means other than a manual joystick 15, such as automated control means, may be employed to provide the input signal J.

The invention claimed is:

1. An electrohydraulic servo system comprising a servo actuator coupled to variably position a load, position sensing means coupled to said actuator and load to provide an electrical signal indicative of actual position at said load, means for generating an input command signal, command means responsive to said input command signal in differing modes of operation for generating a position command signal as correspondingly differing functions of said input command signal, said differing modes of operation including at least a position control mode wherein said input command signal is indicative of desired position at said load, and a velocity control mode wherein said input command signal is indicative of desired velocity at said load, means for providing an error signal to control said servo actuator as a function of a difference between said actual position signal and said position command signal, and means coupled to said command means for selecting between said position and velocity control modes of operation said command means comprising means operable in said position control mode to provide said position command signal as a direct function of said input command signal, and means operable in said velocity control mode for integrating said input command signal to provide said position command signal.

2. The system set forth in claim 1 wherein said differing modes of operation further include an incremental position control mode wherein said input command signal is indicative of desired change of position at said load from a base position, wherein said means coupled to said command means comprises means for selecting among said position, velocity and incremental position control modes, and wherein said command means includes means operable in said incremental position control mode for establishing a said base position, and means for providing said position command signal as a function of the sum of said actual position at said load and said base position.

3. The system set forth in claim 2 wherein said command means includes means operable in said incremental position control mode and responsive to said position sensing means for storing said actual position signal as said base position when said input command signal is equal to zero.

4. The system set forth in claim 3 wherein said mode select means comprises switch means having three positions corresponding to said position, velocity and incremental position control modes.

5. An electrohydraulic servo control system comprising a servo actuator coupled to variably position a load, position sensing means for coupling to said load to provide an electrical signal X indicative of actual position at said load, means for generating an input command signal J, command means responsive to said input command signal J in differing modes of operation for generating a position command signal R as correspondingly differing functions of said input command signal J, means for providing an error signal E to control said servo actuator as a function of a difference between said actual position signal X and said position command signal R, and means coupled to said command means for selecting one among a plurality of differing modes of operation including a position control mode wherein said input command signal J is indicative of desired position at said load, a velocity control mode wherein said input command signal J is indicative of desired velocity at said load, and an incremental position control mode wherein said input command signal J is indicative of a desired change of position at said load, said command means including means responsive to said mode-select means in said position control mode for varying said position command signal R as a direct function of said input command signal J, means responsive to said mode select means in said velocity control mode of operation for integrating said input command signal J to provide a signal R', for varying said position command signal R as a function of said integrated signal R' when said input command signal J is non-zero, and for setting said position command signal R equal to said actual position signal X when said input command signal J is equal to zero, and means responsive to said mode-select means in said incremental position control mode for establishing and storing a base position signal $R_0$ equal to said actual position signal X when said input command signal J is equal to zero, and for varying said position command signal R as a function of the sum of said base position signal $R_0$ and said input command signal J when said input command signal J is non-zero.

* * * * *